Dec. 28, 1965  E. M. KIESS  3,226,275
METHOD OF INTERLOCKING THE YARNS OF KNITTED OR WOVEN FABRIC
Filed Nov. 2, 1961

WITNESS
William Martin Jr.

INVENTOR.
Edward M. Kiess
BY
Marshall J. Breen
ATTORNEY

United States Patent Office 3,226,275
Patented Dec. 28, 1965

3,226,275
METHOD OF INTERLOCKING THE YARNS OF KNITTED OR WOVEN FABRIC
Edward M. Kiess, State College, Pa., assignor to The Singer Company, a corporation of New Jersey
Filed Nov. 2, 1961, Ser. No. 149,735
1 Claim. (Cl. 156—306)

This invention relates to the seaming of knitted or woven material and particularly to methods not employing stitching by needle and thread.

It has been suggested to join two fabric plies by sandwiching between them a ply of thermoplastic material and applying heat and pressure to form a seam. Such seams have in general not been successful because to obtain required strength such methods result in undesirable appearance and lack of flexibility in the seam as compared with the fabric itself.

It is proposed, according to the present invention, to use two opposed thermoplastic monofilaments applied in superposed alignment to the external surfaces of the superimposed fabric pieces to be joined, the subsequent application of heat and pressure to the monofilaments causing fusion of the thermoplastic mass through the interstices of the fabric with resultant encapsulation of the fabric threads within said mass. By controlling the size of the monofilaments, the flexibility of the resultant seam can be easily controlled to suitably match that of the fabric itself.

It is an object of this invention, therefore, to provide a method of seaming knitted or woven fabric resulting in a seam of adequate strength and desirable appearance yet with seam flexibility approaching that of the fabric itself.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

In the drawings, FIG. 1 is an enlarged view showing relationship of electrodes, monofilaments and fabric before bonding using the method of the invention.

Figure 1:
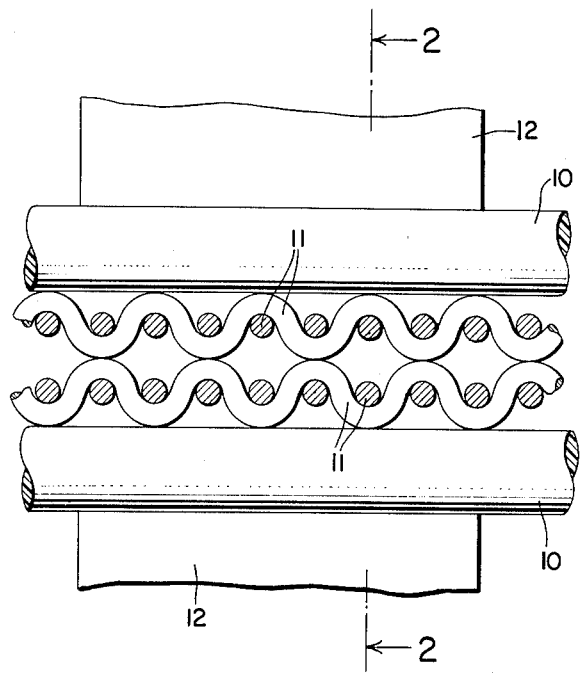
Figure 2:
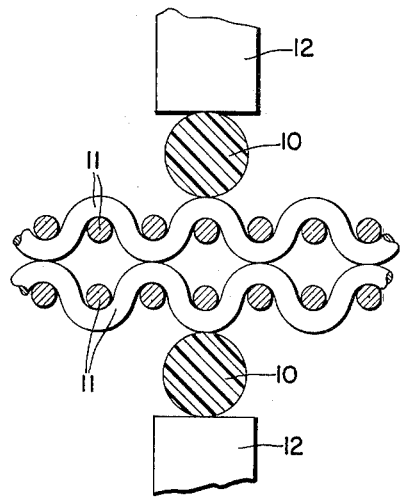
FIG. 2 is an enlarged view taken transversely to that of FIG. 1.
Figure 3:
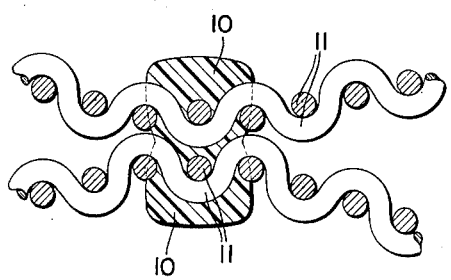
FIG. 3 is an enlarged cross-section of fabric and monofilaments after bonding, taken in the same position as in FIG. 2.

Referring to FIGS. 1 and 2, two thermoplastic monofilaments 10 are placed in parallel superposed alignment on the outside surfaces of two or more pieces of knitted or woven fabric 11. The fabric may be composed entirely of thermoplastic or of non-thermoplastic material or a combination of both. With the application of heat and pressure to the monofilaments by an appropriate means, such as the opposed electrodes 12, the two monofilaments are fused together through the fabric interstices with the fabric portions encapsulated within the fused mass of the monofilament material as seen in FIG. 3.

There are three situations depending on the specific materials as follows:

(1) Where the fabric material 11 is thermoplastic and of the same kind as the monofilaments 10, the material in the seam flows together in cohesive action to form a uniform homogeneous joint of one material having substantially no boundaries within the seam between the fabric yarn and the monofilament mass.

(2) Where the fabric material 11 is thermoplastic but of different kind from that of the monofilaments 10, the monofilaments, when heated properly, will flow through the fabric interstices and unite cohesively. Depending on the softening and melting temperature points of the thermoplastic material in the fabric there will be no, some, or considerable cohesive action between the fabric material and the unlike thermoplastic material of the monofilaments.

(3) Where the fabric material 11 is entirely non-thermoplastic, inasmuch as there is no thermal change in the non-thermoplastic yarn in the fabric to cause cohesion with itself or with the thermoplastic monofilaments 10, the joining is effected wholly by the flow through the fabric interstices of the thermoplastic monofilament material and its subsequent cohesion when the material from the two filaments flows together.

Thermoplastic monofilament thread is currently available in a wide assortment of kinds, sizes and colors and enhances the value of the method of this invention by affording an inexpensive and plentiful material for its practice. Commercially available nylon "6" monofilaments have been found to work well with this method and polyurethane thread has been used with success, the latter providing a stretchy seam.

It will be seen that, with the present method, the bulk in the seam is controlled substantially by the size of the monofilaments used and by selecting sufficiently small filaments the resulting seam may be made to approach the flexibility of the fabric itself where desirable. This is a distinct improvement over the prior art methods where the electrode was the controlling factor in the matter of seam size.

In effect, the seam produced by the method of this invention may be likened to a two-thread lock-stitch seam with stitch length determined automatically by the interstices spacing of the fabric.

While any suitable method of applying heat to the monofilaments may be used, it is preferable and convenient to employ radio-frequency dielectric heating which generates heat internally within the body of the thermoplastic material and so confines the seam to the desired region to produce maximum strength per unit bulk.

It is clear that the monofilaments need not be placed in straight lines but may be arranged in any curvilinear path within their inherent ability to bend and stretch to follow a desired seam configuration.

It has been found that, in certain applications, a satisfactory seam has been formed with this method using only a single monofilament. In the case of attaching very open mesh or weave material such as lace to material of finer weave, a single thermoplastic monofilament is placed on the surface of the open weave material and, when heated, it flows readily through the wide interstices in the open weave material and successively through the under fabric interstices to bind the lace or like material to the fabric.

It has also been found that this method may be used to place a single thermoplastic monofilament along the cut edge of a piece of fabric to inhibit ravelling. Here, again, the thermoplastic monofilament material flows very readily and penetrates and locks into the interstices of the fabric at its edge so that ravelling will not occur.

A special application where the present method of seaming has been used to great advantage is in closing the toe of "seamless" knitted ladies stockings. A ladies nylon stocking comes off the knitting machine with an opening in the toe that has to be closed before the stocking is finished. Present methods of closing are: (1) looping, a hand operation in which an operator manually impales successive loops of consecutive fabric courses on sewing needles, and (2) sewing by an overedging machine that sews in the order of 100 stitches per inch in order to insure that all of the successive loops of the consecutive fabric courses are held by the sewing thread. Looping has the disadvantage of being a slow, tedious process requiring skilled operators and hence, expensive. Sewing produces a product not acceptable as high quality.

In applying the method of this invention to the closing of the toe of ladies nylon stockings, thermoplastic monofilament thread made from nylon "6" and having a diameter of approximately 8 mils has been used successfully. The two monofilaments are bonded to each other, encapsulating and fusing between them all of the knitted terminal loops (of the stocking) within the seam. The resulting seam is strong, flexible, of good appearance and is easier to make than by either of the prior art methods enumerated above.

In its broadest aspects, therefore, this invention comprises a method of interlocking the yarns of knitted or woven fabrics within a common fused thermoplastic mass in a controlled perimetric pattern comprising the placing of a thermoplastic monofilament in the desired pattern on the surface of said fabric and applying heat and pressure to said monofilament to cause flow and fusion of said monofilament material through the interstices between the fabric yarns and subsequent encapsulation of said yarns in a region controlled by the placement and size of the monofilament.

Having thus set forth the nature of this invention, what I claim herein is:

A method of interlocking the yarns of knitted or woven fabric in a controlled perimetric pattern comprising placing a thermoplastic monofilament in the desired pattern on the surface of said fabric, and applying heat and pressure to said monofilament to cause flow and fusion of said monofilament through the interstices between the fabric yarns and subsequent encapsulation of said yarns in a region controlled by the placement and size of the monofilament.

References Cited by the Examiner
UNITED STATES PATENTS

| | | | |
|---|---|---|---|
| 2,313,058 | 3/1943 | Francis | 161—89 |
| 2,435,467 | 2/1948 | Spencer | 156—304 X |
| 2,597,888 | 5/1952 | Miller | 156—88 |
| 2,732,881 | 1/1956 | Anderle | 156—88 |
| 2,804,419 | 8/1957 | De Woskin et al. | 161—89 XR |
| 3,142,604 | 7/1964 | Mills et al. | 156—178 XR |
| 3,142,611 | 7/1964 | Mills | 156—306 XR |

ALEXANDER WYMAN, *Primary Examiner.*
HAROLD ANSHER, *Examiner.*